(12) United States Patent
Qian

(10) Patent No.: US 11,176,644 B2
(45) Date of Patent: Nov. 16, 2021

(54) KEYSTONE CORRECTIONS WITH QUADRILATERAL OBJECTS

(71) Applicant: HEWLETT-PACKARD DEVELOPMENT COMPANY, L.P., Houston, TX (US)

(72) Inventor: Xiangfei Qian, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 65 days.

(21) Appl. No.: 16/077,695

(22) PCT Filed: Jun. 16, 2017

(86) PCT No.: PCT/US2017/037883
§ 371 (c)(1),
(2) Date: Aug. 13, 2018

(87) PCT Pub. No.: WO2018/231246
PCT Pub. Date: Dec. 20, 2018

(65) Prior Publication Data
US 2021/0174478 A1  Jun. 10, 2021

(51) Int. Cl.
*G06T 5/00* (2006.01)

(52) U.S. Cl.
CPC .... *G06T 5/006* (2013.01); *G06T 2207/10024* (2013.01)

(58) Field of Classification Search
CPC .............. G06T 5/006; G06T 2207/10024
USPC ........................................................ 382/275
See application file for complete search history.

(56) References Cited

U.S. PATENT DOCUMENTS

| | | | |
|---|---|---|---|
| 5,850,225 A | 12/1998 | Cosman | |
| 6,520,647 B2* | 2/2003 | Raskar | G03B 21/00 |
| | | | 348/E9.027 |
| 6,753,907 B1* | 6/2004 | Sukthankar | H04N 5/7408 |
| | | | 348/190 |
| 6,755,537 B1 | 6/2004 | Raskar et al. | |
| 7,119,833 B2 | 10/2006 | Jaynes et al. | |
| 7,379,619 B2 | 5/2008 | Ikeda et al. | |
| 7,619,663 B2 | 11/2009 | Sakurai et al. | |
| 7,738,706 B2 | 6/2010 | Aradhye et al. | |

(Continued)

OTHER PUBLICATIONS

Weipeng Xu et al: "Real-time keystone correction for hand-held projectors with an RGBD camera", 2813 IEEE International Conference on Image Processing, IEEE, Sep. 15, 2013 (2013-89-15), pp. 3142-3146, XP032966254, DO I: 18. 1189/ I C I P. 2813. 673864 [retrieved on Feb. 11, 2014] * abstract * * "System Design"; p. 3143 * * "Keystone Correction and Pre-warping"; p. 3144 *.

(Continued)

*Primary Examiner* — Ali Bayat
(74) *Attorney, Agent, or Firm* — Tong, Rea, Bentley & Kim LLC

(57) ABSTRACT

An example method includes receiving by a processor of an image capturing device, an image of a quadrilateral object captured by a camera of the image capturing device. A homography matrix is calculated by the processor based on the image of the quadrilateral object and a known dimension of the quadrilateral object. The processor performs a keystone correction based on the homography matrix to convert a subsequent image captured by the camera into a corrected image.

12 Claims, 5 Drawing Sheets

(56) References Cited

U.S. PATENT DOCUMENTS

| | | | |
|---|---|---|---|
| 8,393,740 B2 | 3/2013 | Sajadi et al. | |
| 8,717,389 B2 | 5/2014 | Chae et al. | |
| 9,208,536 B2 * | 12/2015 | Macciola | G06T 3/00 |
| 10,006,981 B2 * | 6/2018 | Tidhar | G01S 13/582 |
| 10,210,607 B1 * | 2/2019 | Weinschenk | G01B 11/26 |
| 2006/0152682 A1 * | 7/2006 | Matsuda | G03B 21/142 |
| | | | 353/40 |
| 2011/0050595 A1 | 3/2011 | Lundback et al. | |
| 2013/0169888 A1 * | 7/2013 | Tannhauser | H04N 9/3188 |
| | | | 348/745 |
| 2013/0222386 A1 * | 8/2013 | Tannhauser | G06T 3/4038 |
| | | | 345/428 |
| 2015/0093018 A1 | 4/2015 | Macciola et al. | |

OTHER PUBLICATIONS

Li et al., "A Method for Movable Projector Keystone Correction", Journal of Latex Class Files, vol. 6, Issue No. 1, Retrieved from internet—https://pdfs.semanticscholar.org/58aa/ e61e77900de0fdf7ffbe5d9d6ffb8e3109e5.pdf, Jan. 2007, 5 Pages.

* cited by examiner

KEYSTONE CORRECTIONS WITH QUADRILATERAL OBJECTS

BACKGROUND

Cameras are used to capture images of various different scenes or objects. Cameras capture images of scenes that are not perfectly rectangular. Alternatively, cameras may be held or positioned such that they are not perfectly perpendicular to a horizontal centerline of a scene or object. As a result, the images may appear to be distorted when the images are captured and printed. For example, a square may appear as a trapezoid in a captured image.

DETAILED DESCRIPTION

The present disclosure relates to performing keystone corrections of images captured by an image capturing device. Keystone correction may be used by image software to correct the distortions or skew of the images. For example, tall buildings may appear to be leaning to the right or left when printed without keystone correction. The keystone correction may correct the image such that printed image appears to be a tall building that is not leaning to either side.

To apply a correct amount of keystone correction, the camera may be calibrated. Some cameras may perform the calibration on each image. However, performing repeated calibrations can be a time consuming and processor intensive task. Other cameras may perform calibration on the field of view rather than the image itself. Changing the field of view may be undesirable as the viewer may be distracted by the oddly shaped outline of the field of view.

Examples described herein provide an approach to perform a calibration to obtain a homography matrix. The homography matrix may then be applied to perform a keystone correction on subsequently captured images. The present disclosure performs the keystone correction on the image itself and not the field of view. Thus, the images can be correctly displayed or printed on rectangular fields of view, or paper, without distortion. Moreover, the homography matrix may be used repeatedly as long as the camera remains in the same position and viewing angle.

In an example, the calibration may be performed with any quadrilateral object. For example, with the quadrilateral object may be a plain sheet of paper, or other relatively flat rectangular or square object, instead of using a specialized mat.

Figure 1:
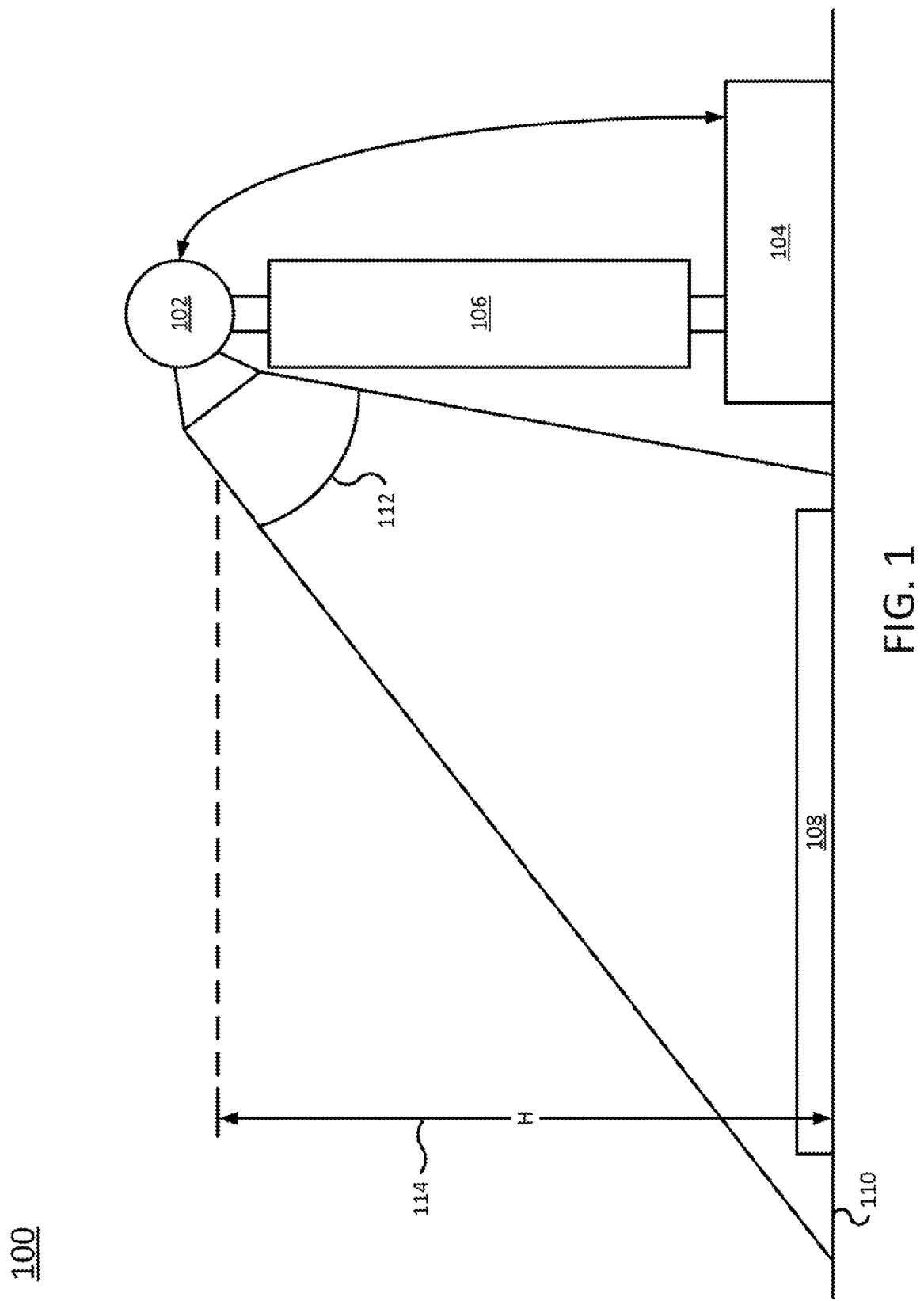
FIG. 1 is a block diagram of a side view of an example system for performing keystone corrections with quadrilateral objects of the present disclosure.

FIG. 1 illustrates a block diagram of a system 100 for performing keystone corrections with quadrilateral objects of the present disclosure. In one implementation, the system 100 may include an image capturing device 102, an endpoint device 104 and a display 106 that is on a surface 110 (e.g., a tabletop, desk, etc.). The image capturing device 102 may be a device that includes a camera or multiple types of cameras to capture an image or different types of images with the multiple types of cameras. The image capturing device 102 may have processing capabilities to perform keystone corrections on the image, as described below. One camera may be a camera to capture still images or photographs and the other types of cameras may be used to capture dimensional information (e.g., a three dimensional camera). The endpoint device 104 may be a desktop computer, a laptop computer, a tablet computer, and the like. The display 106 may be a monitor, a television, and the like.

The image capturing device 102 may be in communication with the endpoint device 104 to provide captured images to the endpoint device 104 for display on the display 106, to be projected by an external image projector (not shown), to be printed on a printing apparatus (not shown), and the like. In one example, the image capturing device 102 may be mounted onto the display 106 at a particular viewing angle 112 and a height 114. However, due to the viewing angle 112 and the height 114 of the image capturing device 102, images that are captured by the image capturing device 102 may be distorted. For example, rectangular objects may appear as trapezoids in the captured image, or parallelograms, depending on how the rectangular object is orientated on the surface 110.

In certain applications, it may be desirable to display a corrected image. In other words, rectangular objects should appear as rectangular objects and not trapezoids in a reproduced image of the image captured by the image capturing device 102 and displayed in an unaltered field of view.

In one example, a quadrilateral object 108 may be used to calibrate the image capturing device 102. The calibration may generate a homography matrix that can be used to perform keystone corrections on the objects within the image itself (as opposed to the viewing area to make the object appear to be correctly oriented).

The quadrilateral object 108 may be any relatively flat object that lies as close to the same plane as the surface 110 as possible. For example, the quadrilateral object 108 may be fractions of millimeters thick. The quadrilateral object 108 may be any rectangular or square object. In one example, the quadrilateral object 108 may be a sheet of paper (e.g., an 8.5 inch×11 inch printing/copy paper).

It should be noted that the quadrilateral object 108 is not drawn to scale in FIG. 1. Although the quadrilateral object 108 is shown as being relatively thick and raised off of the surface 110 in FIG. 1 for ease of illustration, the thickness of the quadrilateral object 108 may be indistinguishable from the surface 110. In other words, the quadrilateral object 108 and the surface 110 may appear to be on the same horizontal plane.

Figure 2:
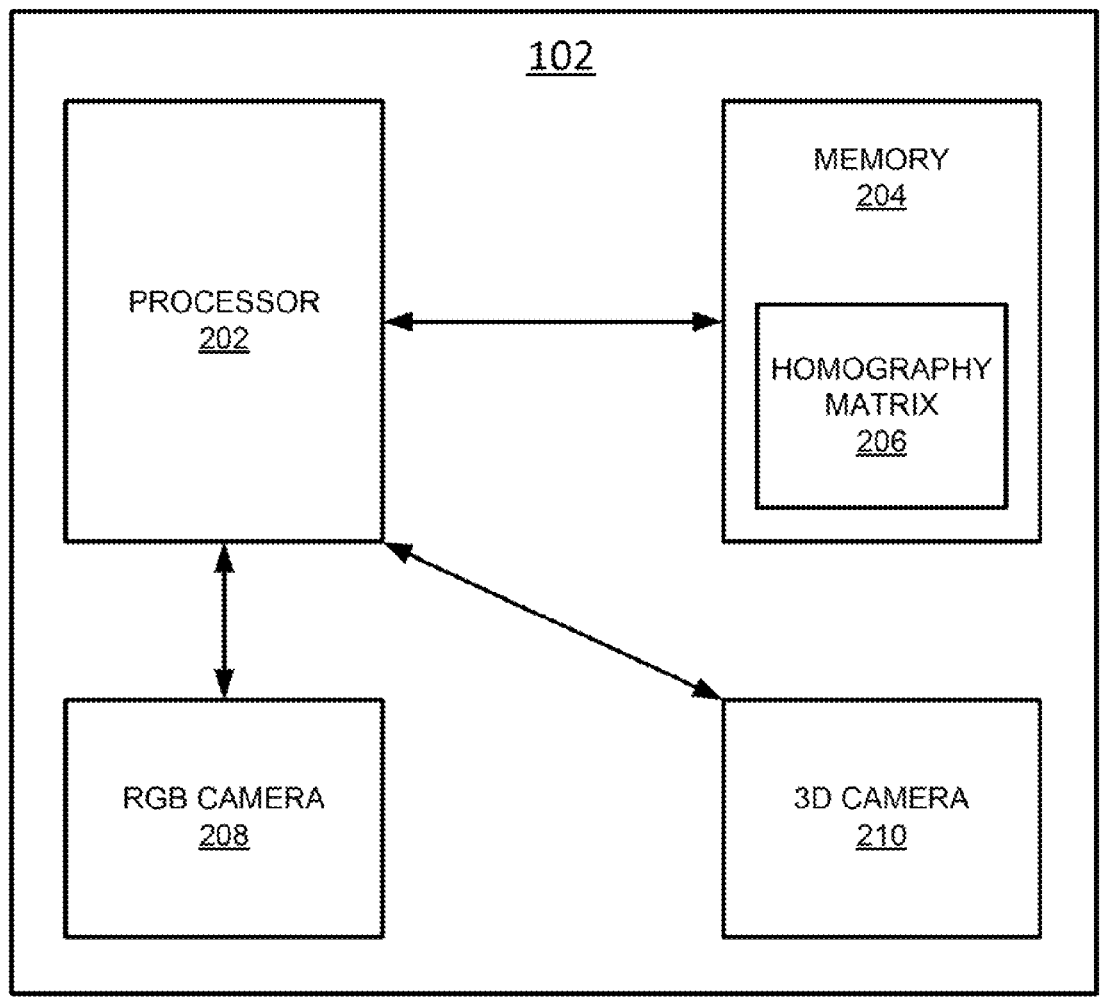
FIG. 2 is a block diagram of an example image capturing device that performs keystone corrections with a quadrilateral object the present disclosure.

FIG. 2 illustrates a block diagram of the image capturing device 102 that performs the keystone corrections described herein. In one example, the image capturing device 102 may include a processor 202, a memory 204, a red, green, blue (RGB) camera 208 and a three dimensional (3D) camera 210. The processor 202 may be in communication with the memory 204, the RGB camera 208 and the 3D camera 210.

Figure 3:
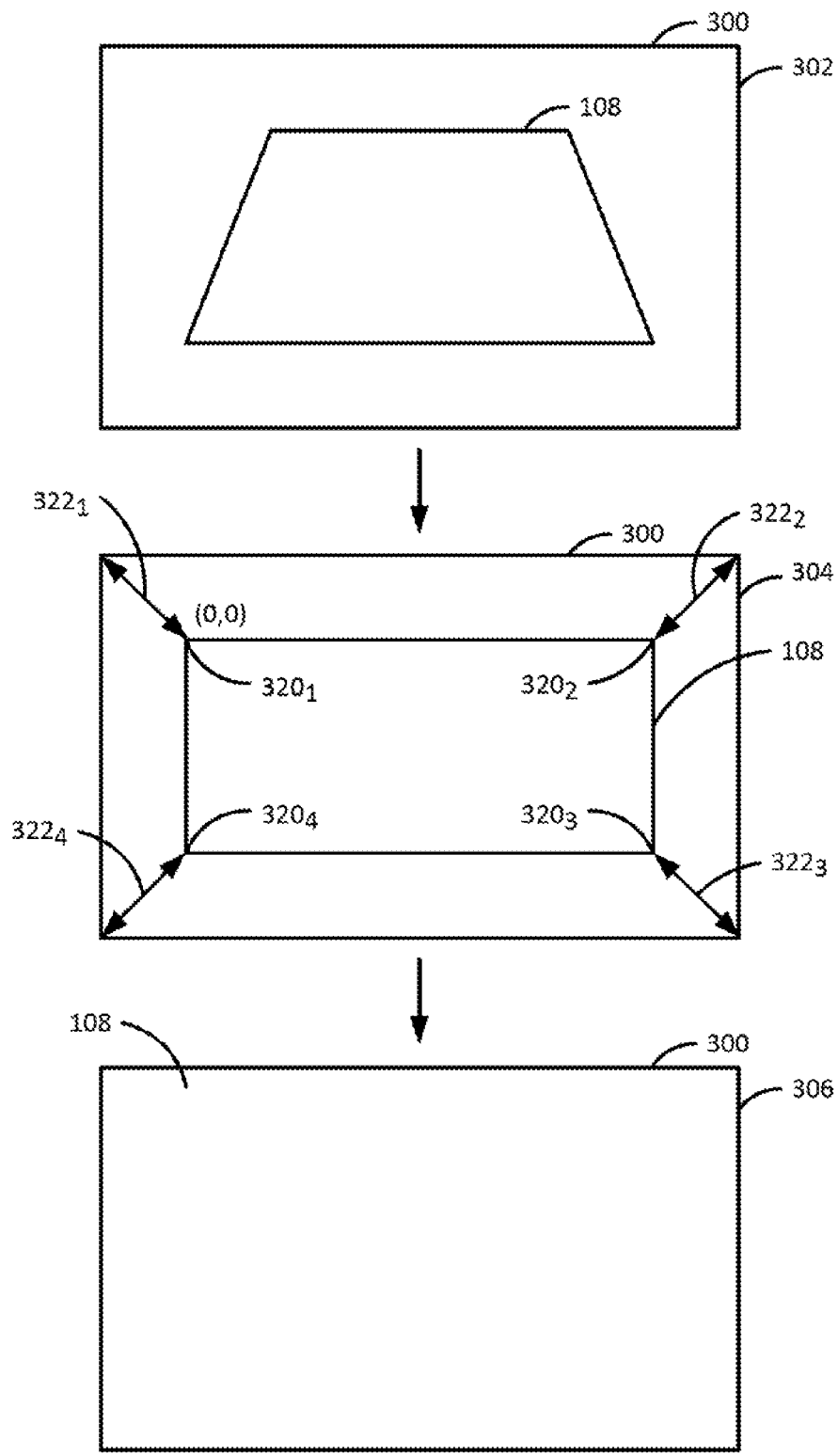
FIG. 3 is a diagram of example images used to calculate a homography matrix.

FIG. 3 illustrates example images used to generate a homography matrix 206 stored in the memory 204 during the calibration process. The images illustrated in FIG. 3 may be referred to in conjunction with the description of the operation of the image capturing device 102.

In one example, the processor 202 may control the RGB camera 208 to capture an image of the quadrilateral object 108. The quadrilateral object 108 may be a rectangle (e.g., an 8.5 inch×11 inch sheet of paper). An example image 302 is illustrated in FIG. 3. The quadrilateral object 108 may be placed on top of the surface 110 and within the viewing angle 112 of the image capturing device 102 such that the entire quadrilateral object 108 fits within a viewing area 300 of the image 302. As noted above, in the present example, the quadrilateral object 108 may be a rectangle but appear as a trapezoid in the image 302.

In one example, the processor 202 may control the 3D camera 210 to capture an image of the quadrilateral object 108 to calculate the dimensions of the quadrilateral object 108. For example, the 3D camera 210 may be a depth sensing camera or a stereoscopic camera that can use existing software functions to measure the dimensions (e.g., a length and a width) of the quadrilateral object 108 based on the 3D image that is captured.

In another example, a user may provide the dimensions to the image capturing device 102 via an interface of the endpoint device 104. For example, the user may enter the dimensions of a width of 8.5 inches and a length of 11 inches on the endpoint device 104. The endpoint device 104 may then transmit the dimensions to the image capturing device 102.

The processor 202 may then generate a theoretical image 304 that would be captured by a camera pointed perfectly perpendicular to a viewing plane of the quadrilateral object 108 using the known dimensions. For example, knowing that the dimensions of the quadrilateral object 108 are 8.5 inches by 11 inches, the processor 202 may generate the theoretical image 304, which may be used as a second image to calculate an initial homography matrix between the theoretical image 304 and the image 302.

The initial homography matrix may then be used to calculate an offset $322_1$, $322_2$, $322_3$, and $322_4$ for each corner $320_1$, $320_2$, $320_3$, and $320_4$, respectively, of the quadrilateral object 108. The offsets $322_1$, $322_2$, $322_3$, and $322_4$ may provide values for how many pixels an object may be moved to reach an edge of the viewing area 300 based off an image that is corrected by the initial homography matrix. For example, in the theoretical image 304, the corner $320_1$ may be set as coordinates (0, 0). The offsets $322_1$, $322_2$, $322_3$, and $322_4$ for each corner $320_1$, $320_2$, $320_3$, and $320_4$ may be calculated with reference to the corner $320_1$ at location (0, 0) and the values of the initial homography matrix.

The offsets $322_1$, $322_2$, $322_3$, and $322_4$ may be applied to the quadrilateral object 108 in the theoretical image 304 to generate a full frame image 306. For example, the quadrilateral object 108 may be corrected by the initial homography matrix and adjusted by the offsets $322_1$, $322_2$, $322_3$, and $322_4$ to fill the entire viewing area 300. As a result, the corrected image of the quadrilateral object 108 may appear to be rectangular rather than as a trapezoid in the image 302.

The processor 202 may then use the image 302 and the image 306 to calculate the homography matrix 206 that is stored in the memory 204. The homography matrix 206 may then be applied to images subsequently captured by the RGB camera 208. The homography matrix 206 may be used to perform keystone corrections on objects within the image within the viewing area 300, rather than correcting the viewing area 300 to make the object appear to be corrected. Thus, the processor 202 may convert a subsequent image captured by the RGB camera 208 into a corrected image by applying a keystone correction based on the homography matrix 206.

Furthermore, after the homography matrix 206 is calculated, the homography matrix 206 may be repeatedly used. In other words, the calibration process described may be performed once as long as the image capturing device 102 is not moved. In other words, as long as the image capturing device 102 maintains the same viewing angle 112 at the same height 114 for subsequently captured images, the same homography matrix 206 may be used to perform keystone corrections on the subsequently captured images.

In one example, the processor 202 may store the viewing angle 112 in the memory 204. Before an image is captured by the RGB camera 208, the processor 202 may compare a current viewing angle 112 to the stored viewing angle 112 to determine if the image capturing device 102 has been moved. If the image capturing device 102 has been moved, the processor 202 may initiate the calibration process described above to update the values of the homography matrix 206 for the new viewing angle 112. For example, an updated image of the quadrilateral object 108 may be captured by the image capturing device 102 after being moved. The updated image may be used to calculate an updated homography matrix that can be used to perform keystone corrections.

Figure 4:
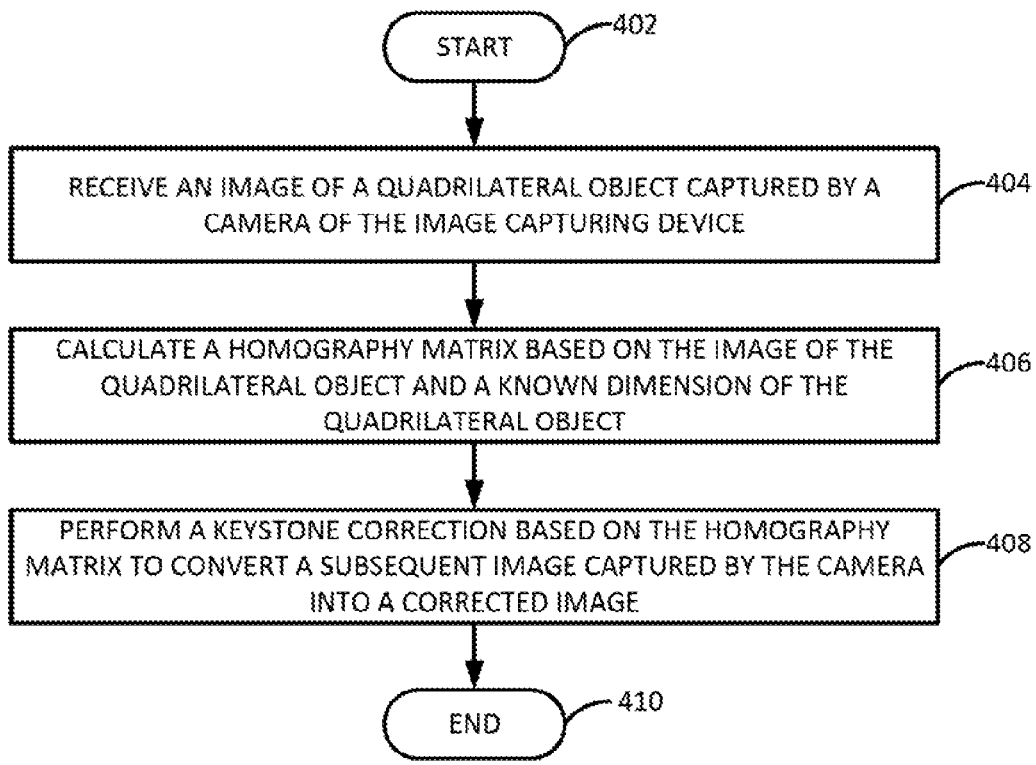
FIG. 4 is a flow chart of an example method for performing a keystone correction with a quadrilateral object of the present disclosure.

FIG. 4 illustrates a flow diagram of an example method 400 for performing keystone corrections with quadrilateral objects. In one example, the method 400 may be performed by the image capturing device 102 or an apparatus 500 described below and illustrated in FIG. 5.

At block 402, the method 400 begins. At block 404, the method 400 receives an image of a quadrilateral object captured by a camera of the image capturing device. For example, an RGB camera of the image capturing device may capture an image of the quadrilateral object at a particular viewing angle. The image of the quadrilateral object may be distorted making the quadrilateral object appear as a trapezoid, or parallelogram, depending on how the quadrilateral object is oriented within the field of view of the image capturing device.

In one example, the quadrilateral object may be a relatively flat object. For example, the quadrilateral object may be a sheet of paper, or other flat square or rectangular object.

At block 406, the method 400 calculates a homography matrix based on the image of the quadrilateral object and a known dimension of the quadrilateral object. In one example, the dimensions (e.g., a length and width) of the quadrilateral image may be automatically calculated by an image captured by a 3D camera of the image capturing device. In another example, the dimensions of the quadrilateral image may be provided by a user via a user interface of an endpoint device that is in communication with the image capturing device.

With the known dimensions, a theoretical image of the quadrilateral object may be generated. For example, if the quadrilateral object was a rectangular sheet of paper, the theoretical image would show a rectangular sheet of paper having the known dimensions scaled relative to the known dimensions. The theoretical image would appear as if a camera that is perpendicular to a horizontal plane of the rectangular sheet of paper captured the theoretical image. With the image captured by the RGB camera in block 404 and the theoretical image, an initial homography matrix may be calculated.

An offset for each corner of the quadrilateral object in the theoretical image may be calculated. For example, the top left corner of the quadrilateral object may be set with initial coordinates (0, 0). The offset may be calculated for each corner with reference to the initial coordinates (0, 0) of the top left corner of the quadrilateral object. The offset may provide values with respect to how much each corner of the quadrilateral object that is corrected by the initial homography matrix may be stretched to fill a field of view. The offsets may be applied to the quadrilateral object to generate a full frame image of the quadrilateral object.

The full frame image of the quadrilateral object and the distorted image of the quadrilateral object captured in block 404 may then be used to generate a homography matrix that can be applied to subsequently captured images. The homography matrix may be stored in memory and used for subsequent images captured by the RGB camera as long as the image capturing device is not moved.

At block 408, the method 400 performs a keystone correction based on the homography matrix to convert a subsequent image captured by the camera into a corrected image. For example, the image capturing device may capture another picture with the RGB camera. The object within the subsequent image may appear to be distorted. However, the homography matrix that was previously calculated and stored in memory may be applied to the subsequent image to perform a keystone correction and generate a corrected image.

In one example, the corrected image may have an unaltered field of view and the object within the image may be corrected by the keystone correction. In other words, if the original field of view was a rectangle and the object was a rectangle that appeared as a trapezoid in the subsequent image, the corrected image may still have a field of view that is a rectangle and the object may appear as a rectangle instead of a trapezoid. At block 410, the method 400 ends.

Figure 5:
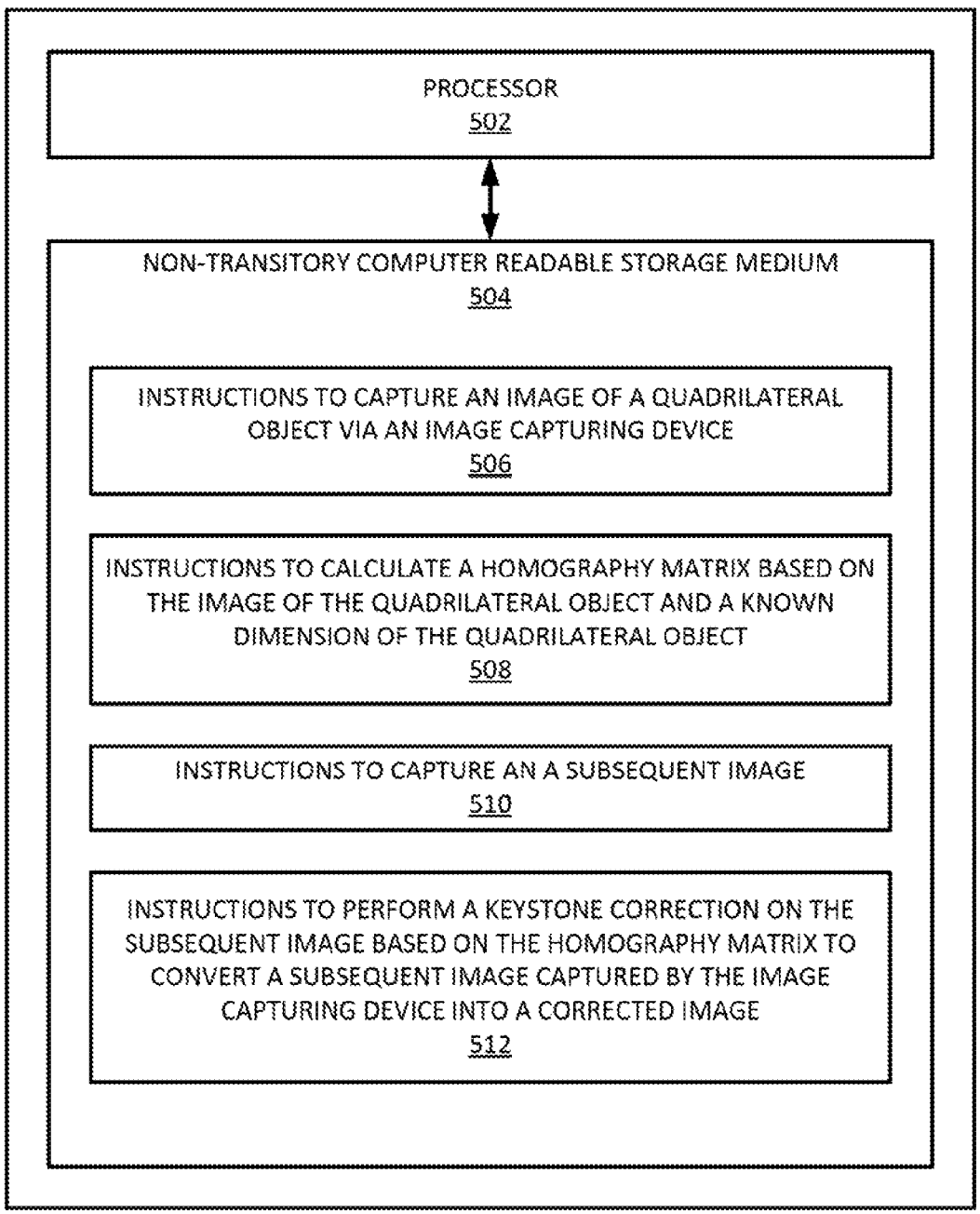
FIG. 5 is a block diagram of an example non-transitory computer readable medium storing instructions executed by a processor of the present disclosure.

FIG. 5 illustrates an example of an apparatus 500. In one example, the apparatus 500 may be the image capturing device 102. In one example, the apparatus 500 may include a processor 502 and a non-transitory computer readable storage medium 504. The non-transitory computer readable storage medium 504 may include instructions 506, 508, 510 and 512 that when executed by the processor 502, cause the processor 502 to perform various functions.

In one example, the instructions 506 may include instructions to capture an image of a quadrilateral object in view of the image capturing device. The instructions 508 may include instructions to calculate a homography matrix based on the image of the quadrilateral object and a known dimension of the quadrilateral object. The instructions 510 may include instructions to capture a subsequent image. The instructions 512 may include instructions to perform a keystone correction on the subsequent image based on the homography matrix to convert a subsequent image captured by the image capturing device into a corrected image.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method, comprising:
receiving, by a processor of an image capturing device, an image of a quadrilateral object captured by a camera of the image capturing device;
calculating, by the processor, a homography matrix based on the image of the quadrilateral object and a known dimension of the quadrilateral object, wherein the calculating the homography matrix comprises:
calculating, by the processor, an initial homography matrix based on the known dimension of the quadrilateral object and the image;
generating, by the processor, a rectangular image of the quadrilateral object using the initial homography matrix;
calculating, by the processor, a respective offset of each one of four corners of the rectangular image of the quadrilateral object and the quadrilateral object in the image; and
generating, by the processor, the homography matrix based on the respective offset of the each one of the four corners; and
performing, by the processor, a keystone correction based on the homography matrix to convert a subsequent image captured by the camera into a corrected image.

2. The method of claim 1, wherein the known dimension comprises a length and a width of the quadrilateral object.

3. The method of claim 1, wherein the known dimension is received via a user interface from a user.

4. The method of claim 1, wherein the known dimension is detected based on a three dimensional camera of the image capturing device.

5. The method of claim 1, wherein the receiving and the calculating are repeated when the image capturing device is moved.

6. A non-transitory computer readable storage medium encoded with instructions executable by a processor of image capturing device, the non-transitory computer-readable storage medium comprising:
instructions to capture an image of a quadrilateral object via the image capturing device;
instructions to calculate a homography matrix based on the image of the quadrilateral object and a known dimension of the quadrilateral object;
instructions to capture a subsequent image; and
instructions to perform a keystone correction on the subsequent image based on the homography matrix to convert a subsequent image captured by the image capturing device into a corrected image, wherein the instructions to capture the image of the quadrilateral object and the instructions to calculate the homography matrix are repeated when the image capturing device is moved.

7. The non-transitory computer readable storage medium of claim 6, wherein the instructions to calculate the homography matrix comprises:
instructions to calculate an initial homography matrix based on the known dimension of the quadrilateral object and the image;
instructions to generate a rectangular image of the quadrilateral object using the initial homography matrix;
instructions to calculate a respective offset of each one of four corners of the rectangular image of the quadrilateral object and the quadrilateral object in the image; and
instructions to generate the homography matrix based on the respective offset of the each one of the four corners.

8. The non-transitory computer readable storage medium of claim 6, wherein the known dimension comprises a length and a width of the quadrilateral object.

9. The non-transitory computer readable storage medium of claim 6, wherein the known dimension is received via a user interface from a user.

10. The non-transitory computer readable storage medium of claim 6, wherein the known dimension is detected based on a three dimensional camera of the image capturing device.

11. An apparatus, comprising:
- a red, green, and blue (RGB) camera to capture an image of a quadrilateral object;
- a three dimensional (3D) camera to detect dimensions of the quadrilateral object; and
- a processor in communication with the RGB camera and the 3D camera to:
  - calculate a homography matrix based on the image of the quadrilateral object and the dimensions of the quadrilateral object,
  - perform a keystone correction based on the homography matrix to convert a subsequent image captured by the RGB camera into a corrected image,
  - detect movement of the apparatus, and
  - calculate an updated homography matrix based on an updated image of the quadrilateral object and the dimensions of the quadrilateral object.

12. The apparatus of claim 11, wherein to calculate the homography matrix, the processor is to:
- calculate an initial homography matrix based on the known dimension of the quadrilateral object and the image;
- generate a rectangular image of the quadrilateral object using the initial homography matrix;
- calculate a respective offset of each one of four corners of the rectangular image of the quadrilateral object and the quadrilateral object in the image; and
- generate the homography matrix based on the respective offset of the each one of the four corners.

* * * * *